United States Patent
Baruzzini et al.

(10) Patent No.: US 9,512,821 B2
(45) Date of Patent: Dec. 6, 2016

(54) ACTIVE BLEED FOR AIRFOILS

(71) Applicant: Lockheed Martin Corporation, Bethesda, MD (US)

(72) Inventors: Dan Baruzzini, Keller, TX (US); Neal David Domel, Fort Worth, TX (US); Jeffrey G. Hakes, Mansfield, TX (US); Daniel N. Miller, Bainbridge Island, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 577 days.

(21) Appl. No.: 13/967,566

(22) Filed: Aug. 15, 2013

(65) Prior Publication Data

US 2015/0050147 A1    Feb. 19, 2015

(51) Int. Cl.
| | |
|---|---|
| *F03D 7/02* | (2006.01) |
| *F15D 1/00* | (2006.01) |
| *F03D 1/06* | (2006.01) |
| *B64C 21/06* | (2006.01) |
| *B64C 21/08* | (2006.01) |

(52) U.S. Cl.
CPC ............ *F03D 7/022* (2013.01); *B64C 21/06* (2013.01); *B64C 21/08* (2013.01); *F03D 1/0675* (2013.01); *F15D 1/0055* (2013.01); *F15D 1/0095* (2013.01); *F05B 2240/30* (2013.01); *Y02E 10/721* (2013.01); *Y02E 10/722* (2013.01); *Y02E 10/723* (2013.01); *Y02T 50/166* (2013.01)

(58) Field of Classification Search
CPC ............................ F03D 1/0633; F03D 1/065
See application file for complete search history.

(56) References Cited

U.S. PATENT DOCUMENTS

| | | | | |
|---|---|---|---|---|
| 2,156,133 A | * | 4/1939 | Troller | B64C 11/24 415/914 |
| 2,833,492 A | * | 5/1958 | Fowler | B64C 21/06 244/209 |
| 3,109,499 A | * | 11/1963 | Fritz | B64C 11/16 416/231 R |
| 3,128,973 A | * | 4/1964 | Dannenberg | B64C 21/06 415/914 |
| 3,262,658 A | * | 7/1966 | Reilly | B64C 23/00 244/207 |
| 3,521,837 A | * | 7/1970 | Papst | B64C 21/06 416/231 R |

(Continued)

FOREIGN PATENT DOCUMENTS

WO    0100488 A1    1/2001

OTHER PUBLICATIONS

European Search Report for EP Application No. 14181184.4 dated Mar. 27, 2015, mailed on Apr. 8, 2015.

(Continued)

*Primary Examiner* — Mary A Davis
(74) *Attorney, Agent, or Firm* — Reising Ethington P.C.

(57) ABSTRACT

An airfoil active bleed system and related method. A housing includes an induction wall, an exhaust wall having one or more exhaust ports, and a chamber between the induction and exhaust walls. Zero-net-mass-flux actuators are located in the chamber and configured and positioned to collectively induct fluid through the induction wall and selectively exhaust fluid through the exhaust port(s).

18 Claims, 3 Drawing Sheets

(56) References Cited

U.S. PATENT DOCUMENTS

| | | | |
|---|---|---|---|
| 4,802,642 A * | 2/1989 | Mangiarotty | B64C 23/00 244/130 |
| 6,457,654 B1 | 10/2002 | Glezer et al. | |
| 6,752,358 B1 * | 6/2004 | Williams | B64C 1/12 244/208 |
| 7,296,395 B1 | 11/2007 | Hartman et al. | |
| 7,931,445 B2 * | 4/2011 | Haans | F03D 1/0608 416/1 |
| 8,267,653 B2 | 9/2012 | Nies et al. | |
| 8,382,043 B1 * | 2/2013 | Raghu | B64C 21/04 244/1 N |
| 9,194,369 B2 * | 11/2015 | Dixon | F03D 1/0675 |
| 2002/0195526 A1 | 12/2002 | Barrett et al. | |
| 2010/0076614 A1 | 3/2010 | Nies et al. | |
| 2011/0024092 A1 * | 2/2011 | Gerlach | F28D 1/05333 165/104.34 |
| 2011/0309201 A1 | 12/2011 | Hassan et al. | |

OTHER PUBLICATIONS

Gopi Krishnan, Kamran Mohseni; An Experimental Study of a Radial Wall Jet Formed by the Normal Impingement of a Round Synthetic Jet; European Journal of Mechanics B/Fluids; pp. 269-277.

Susan Althoff Gorton et al; Active Flow Control on a Boundary-Layer-Ingesting Inlet; American Institute of Aeronautics and Astronautics; pp. 1-12.

Scott J. Johnson et al; Active Load Control Techniques for Wind Turbines; Sandia Report, Aug. 2008; pp. 1-132.

* cited by examiner

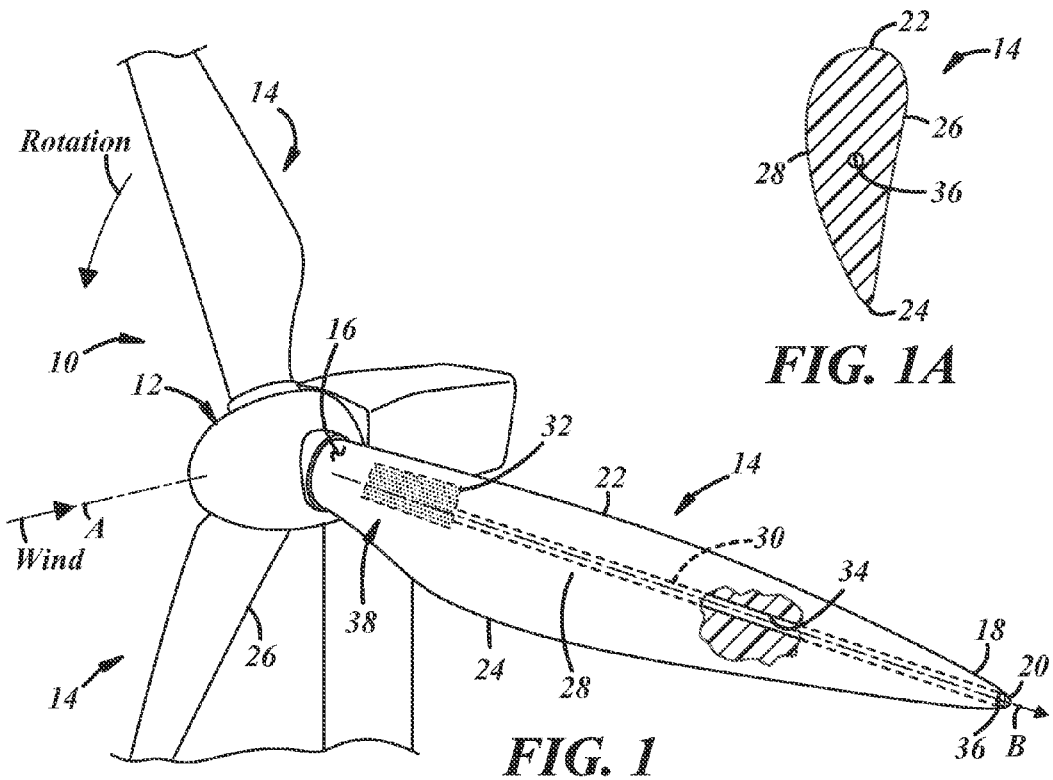
FIG. 1A
FIG. 1
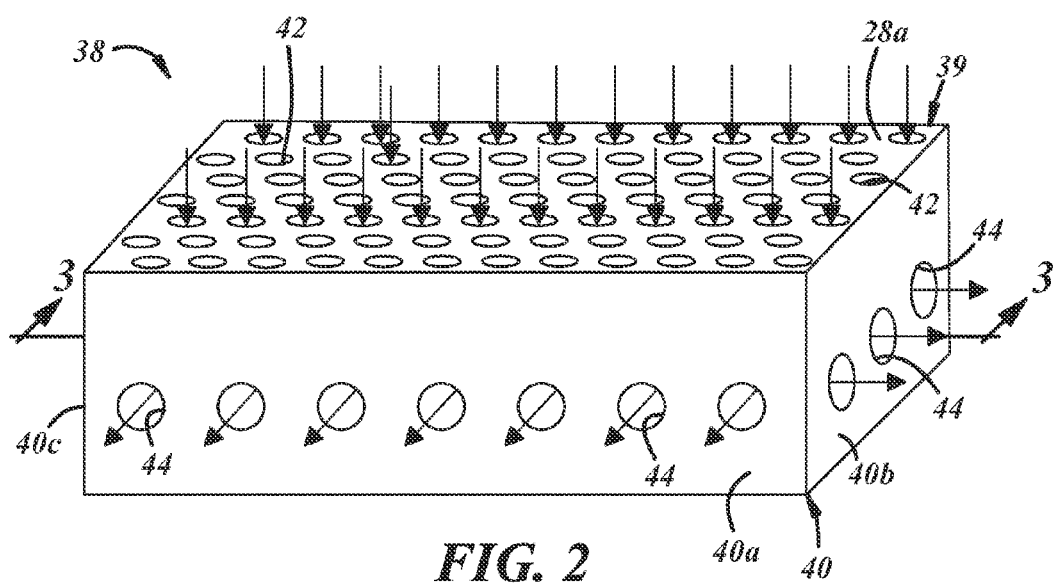
FIG. 2

ACTIVE BLEED FOR AIRFOILS

BACKGROUND

Technical Field

This invention relates generally to airfoils and, more particularly, to suction boundary layer control for airfoils having surfaces with fluid passages open to a working fluid.

Description of the Related Art Including Information Disclosed Under 37 CFR 1.97 and 1.98

Airfoils have surfaces that react with or work on a working fluid that flows over the surfaces. For example, an airplane includes wings over which a working fluid flows to lift or sustain the airplane. In another example, a wind turbine includes a hub coupled to an electrical generator, and several blades extending radially outwardly from the hub to react with wind to turn the hub and generator and produce electricity. Similar examples exist for marine propellers, turbine engine rotors, helicopter rotors, and the like.

During relative motion between a working fluid and a surface of an airfoil, different layers of fluid flow can be identified. Of those, the fluid flow layer closest to the airfoil surface is known as the boundary layer. The boundary layer is characterized by fluid laminae that decrease in fluid velocity relative to the airfoil surface as a function of proximity to the surface. The flow in the boundary layer may be laminar wherein fluid laminae of different velocities create a smoothly-varying velocity profile to follow the contour of the surface. However, the fluid flow in the boundary layer over certain portions of the airfoil surface may become turbulent wherein additional time dependent velocity perturbations occur in the fluid while the mean flow may continue to follow the contour of the airfoil surface. A turbulent boundary layer has higher mean velocities near the surface and is less susceptible to separation than a laminar boundary layer. Where an airfoil surface turns abruptly, or a shock wave occurs, fluid flow may separate from the airfoil surface, resulting in relatively low pressure and reversed flow near the body surface, thereby contributing to increased drag, a reduction in lift, or reduced control effectiveness.

Accordingly, suction devices are used to remove boundary layer at strategic locations on airfoil surfaces to maintain attached fluid flow and thereby delay and/or reduce flow separation to reduce drag, increase lift, and/or increase control effectiveness. Conventional suction devices are effective, but are often complex, large, and/or heavy.

BRIEF SUMMARY

An active airfoil boundary layer control system includes a housing including an induction wall, an exhaust wall having at least one exhaust port, and a chamber between the induction and exhaust walls. The system also includes at least one zero-net-mass-flux actuator in the chamber including an orifice in fluid communication between the induction wall and the at least one exhaust port and aligned with the at least one exhaust port.

Additionally provided is an active bleed system for an airfoil, including a housing including an induction wall, an exhaust wall having one or more exhaust ports, and a chamber between the induction and exhaust walls. The system also includes a plurality of zero-net-mass-flux actuators located in the chamber and configured and positioned to at least augment bleed through the airfoil by collectively inducting fluid through the induction wall and selectively exhausting fluid through the one or more exhaust ports.

Also provided is a method of actively controlling a boundary layer of fluid flowing over an airfoil suction surface. The method includes inducting at least some of the fluid through a portion of the suction surface, into a chamber under the suction surface, and into an orifice of a zero-net-mass-flux actuator located in the chamber. The method also includes exhausting fluid out of the actuator through the orifice thereof, through an exhaust port aligned with the actuator orifice, and out of the chamber to an interior of the airfoil.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 1 is a fragmentary, perspective, schematic view of an illustrative embodiment of a boundary layer control system as embodied within a windmill turbine blade;

FIG. 1A is a mid-span cross-sectional view (along axis B, but in opposite direction from tip toward root) of the blade of FIG. 1;

FIG. 2 is an enlarged orthogonal view of the system of FIG. 1;

DETAILED DESCRIPTION

Figure 3:
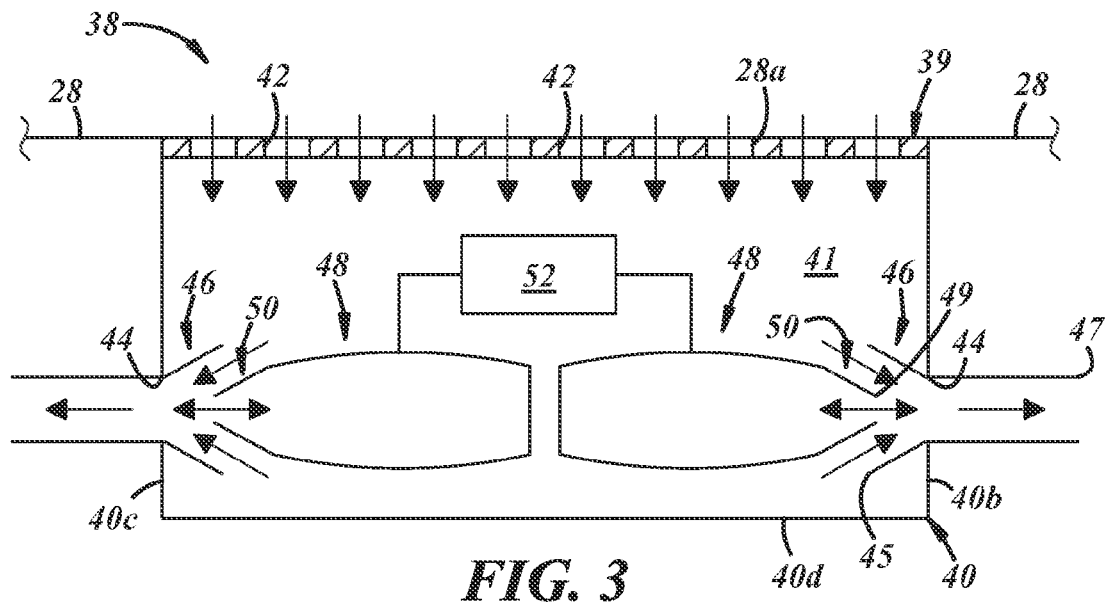
FIG. 3 is an cross-sectional, schematic, side view taken along line 3 of the system of FIG. 2 and including a pair of actuators.

FIG. 1 shows an illustrative embodiment of an active bleed system 38 for controlling a boundary layer over an airfoil. In the illustrated airfoil example, a rotor 10 includes a hub 12 defining a rotational axis A of the rotor 10, which is intended to rotate about the axis A. The rotor 10 also includes one or more of a rotor blade 14 extending generally radially outwardly from the hub 12 along a longitudinal axis B of the blade 14. Although three separate blades 14 are shown, any suitable quantity of blades may be used. In general, the components of the rotor 10 can be manufactured according to techniques known to those skilled in the art, including casting, forging, molding, machining, stamping, and/or the like. Likewise, any suitable materials can be used in making the components, such as metals like aluminum or steel, composites, polymeric materials, and/or the like.

The illustrative embodiment will be described and illustrated with reference to its use in a wind turbine environment. However, it will be appreciated as the description proceeds that the invention is useful in many different applications and may be implemented in many other embodiments. In this regard, and as used herein and in the claims, it will be understood that the present disclosure applies not only to wind turbine applications, but also to other airfoil applications, for instance, aircraft and propellers, turbine engine rotors, helicopter rotors, and various other applications, and regardless of the type of working fluid used in conjunction with the airfoil.

Still referring to FIG. 1, the airfoil or blade 14 includes a root region 16 proximate the hub 12, and a tip region 18 distal the hub 12 and disposed radially outwardly of the root region 16. The root region 16 may be integrally or separately coupled to the hub 14 for example, by forming, casting, forging, welding, fastening, or in any other suitable manner, and may be rotatable relative to the hub about axis B to vary blade pitch. The tip region 18 may include a radially outermost surface 20 of the blade 14. The blade 14 also includes a leading edge or surface 22 extending between the root and tip regions 16, 18, and a trailing edge or surface 24 extending between the root and tip regions 16, 18. The leading and trailing surfaces 22, 24 may be rounded, flat, pointed, and/or of any other suitable shape(s).

Referring to FIG. 1, the blade 14 further includes a first or pressure surface 26 (FIG. 1A) extending between the root and tip regions 16, 18 and the leading and trailing surfaces 22, 24, and a second or suction surface 28 extending between the root and tip regions 16, 18 and the leading and trailing surfaces 22, 24. The pressure and suction surfaces 26, 28 may be of any suitable shape(s) or contour(s) and the blade 14 need not be airfoil-shaped and may be of any suitable shape and disposed at any suitable angle(s).

The blade 14 additionally includes a bleed path 30 opening to the suction surface 28, extending through the blade 14, and exiting to the tip region 20, the trailing surface 24, or both. The bleed path 30 is provided to bleed low energy working fluid from the suction surface 28 to improve efficiency. Working fluid flows into suction surface 28 and through bleed path 30 to actively bleed working fluid from the suction surface 28 and thereby prevent or reduce boundary layer separation and/or a laminar separation bubble of working fluid on the suction surface 28.

As shown in FIG. 1, the bleed path 30 generally may extend along, or parallel with respect to, the blade axis B. However, the bleed path 30 may be disposed at any suitable angle with respect to the axis B, and need not be centered between the leading and trailing surfaces 22, 24. The bleed path 30 includes an inlet 32 located in the suction surface 28 to receive working fluid on the suction surface 28, and a conduit 34 in communication with the inlet 32 to convey the working fluid from the inlet 32 in a radially outward direction toward the tip and/or trailing edge region 18 of the blade 14 and directed through a discrete exit into the wake of the blade such that it does not re-encounter the blade surface. The bleed path 30 also includes an outlet 36 in communication with the conduit 34 and disposed radially outwardly of the inlet 32 to exhaust the working fluid out of the blade 14.

The inlet 32 may be of any suitable size and shape. For example, the inlet 32 may be a surface area of rectangular or any other suitable shape that may extend in a circumferential and radial direction over at least a portion of the suction surface 28 that may otherwise experience boundary layer separation if not for the inlet 32 and bleed system 38. The inlet 32 may extend parallel with the axis B and may be located between, for instance, centered between, the leading and trailing surfaces 22, 24. However, the inlet 32 may be disposed at any suitable angle with respect to the axis B, and need not be centered between the leading and trailing surfaces 22, 24.

As will be described in further detail herein below, pumping forces pull working fluid into the inlet 32, and push the fluid through the conduit 34 and out of the outlet 36. Such fluid flow may reduce or thin a boundary layer, and also may at least reduce, and preferably prevent, laminar separation of the working fluid on the suction surface 28 of the blade 14. The conduit 34 may include one or more separate components and/or a hollow interior of the airfoil blade 14. The working fluid actively flows through the bleed path 30 under pressurization, as discussed below.

With reference to FIGS. 2 and 3, the active bleed or airfoil boundary layer control system 38 may be carried between the pressure and suction surfaces 26, 28 (FIG. 1) and includes a housing with at least one induction wall 39, one or more exhaust walls 40, and a chamber 41 (FIG. 3) between the induction and exhaust walls 39, 40. The induction wall 39 has an exterior surface 28a that is gas permeable, for instance, porous, and/or apertured, for example, with apertures 42. Accordingly, the induction wall 39 may be part of the bleed path 30, at the suction surface 38. More specifically, the surface 28a of the wall 39 may be flush with the suction surface 28 of the blade 14. The exhaust wall(s) 40 may include side walls 40a and end walls 40b, 40c and a bottom wall 40d, one or more of which may have one or more exhaust ports 44 (FIG. 2). The exhaust walls(s) 40 may be recessed beneath or behind the suction surface 28 (FIG. 1) so that the exhaust ports 44, likewise, discharge beneath the suction surface 28. Although illustrated as rectangular, the housing may be of any suitable shape, size, and/or configuration.

The system 38 also includes one or more zero-net-mass-flux (ZNMF) actuators 48 in the chamber 41. The actuators 48 are configured and positioned to at least augment bleed through the airfoil. With or without the actuators 48 some passive bleed may occur by virtue of the inlet 32, the outlet 36, the conduit 34 therebetween, and centrifugal pumping forces resulting from rotation of the rotor 10. The actuators 48 may augment the passive bleed by collectively inducting fluid through the induction wall and selectively exhausting fluid through the one or more exhaust ports.

Figure 4:
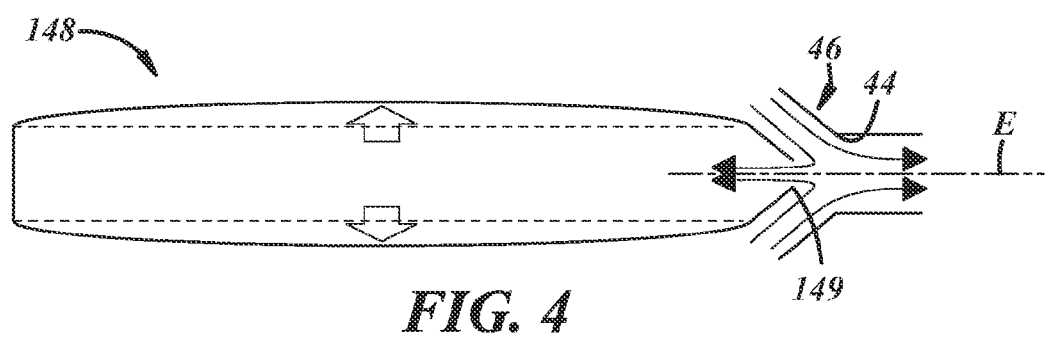
FIG. 4 is an enlarged schematic view of the actuator of FIG. 3 in an inhalation state.
Figure 5:
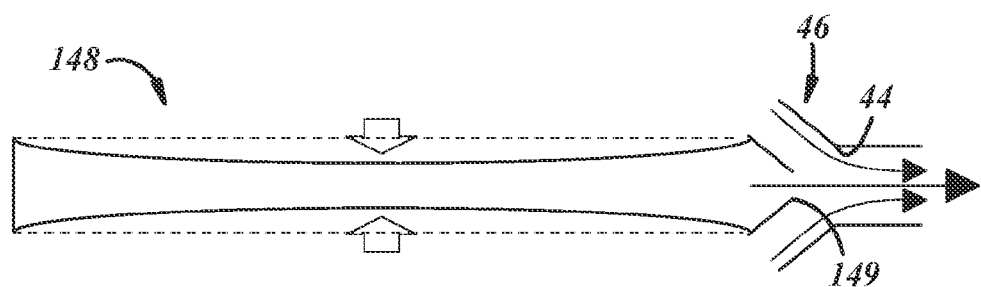
FIG. 5 is an enlarged schematic view of the actuator of FIG. 3 in an exhalation state.

For example, and with reference to FIGS. 3-5, ZNMF actuators 48, 148 may mimic a bellows type of operation to pull fluid into the chamber 41 (FIG. 3) and into the actuators 48, 148 during an inhalation portion of a cycle (as best shown in FIG. 4) and to push fluid out during an exhalation portion of the cycle (as best shown in FIG. 5). Each actuator 48, 148 may include an orifice 49, 149 in fluid communication between the induction wall 39 (FIG. 3) and a corresponding one of the exhaust ports 44 and axially aligned therewith. The exhaust ports 44 may include nozzles 46 that may extend inwardly, for instance, from the exhaust wall(s) 40 to the chamber 41 (FIG. 3). Not all of the working fluid need be drawn into the actuators 48, 148. Rather, only a portion of the fluid inducted through the inlet 32 (FIG. 3) may be inhaled into and exhaled from the actuators 48, 148. Such exhalation may serve to augment flow or enhance entrainment of flow of other portions of the fluid through the exhaust port(s) 44.

With reference to FIG. 4, the actuator orifice 149 may be in registration with the corresponding exhaust port 44. For example, as illustrated, the actuator orifice 149 axially overlaps the nozzle 46 in a direction along an exhaust axis E extending longitudinally through the nozzle 46. In another example, as illustrated, the nozzle 46 may be larger in diameter than the actuator orifice 149. The orifice 149 may be registered with the exhaust port 44 in any other suitable manner.

Referring to FIG. 3, the nozzle 46 may include an entrance 45 on an interior side of the exhaust wall 40 and an exit 47 on an exterior side of the exhaust wall 40. As illustrated, the nozzle 46 may be generally frustoconical in shape, the nozzle entrance 45 may have a larger diameter than nozzle exit 47, and the actuator orifice 49 may be conically convergent at an open end and circumscribed by the nozzle entrance 45. Accordingly, the arrangement of actuators 48 and exhaust outlets 44 may provide pulsable ejectors or synthetic jets for efficient pumping and precise control of fluid flow.

The system 38 also may include a controller 52 in communication with the actuators 48. In general, the controller 52 may receive and process input from any suitable sensors and any other suitable input devices in light of stored instructions and/or data, and transmit output signals to a power supply (not shown) coupled to the actuators 48, to the actuators 48 themselves, to switches between the power supply and the actuators 48, and to any other suitable devices. The controller 52 may be programmed to provide electricity or electrical pulses to the actuators 48 to operate the system 38. The duration and synchronization of pulses of actuators 48 may be optimized to maximize entrainment of the bleed flow. The pulses may be as short as several nanoseconds, or as long as is required, and can also be repeated at either very high rate (up to some number of KHz) in order to optimize the interaction between the cyclical actuator motion and the inertial/compressibility properties of the fluid.

The controller 52 may include, for example, an electrical circuit, an electronic circuit or chip, and/or a computer. Although not separately shown, the controller 52 generally may include a processor, memory that may be coupled to the processor, and one or more interfaces coupling the controller 52 to one or more other devices. Although not shown, the controller 52 and other powered system devices may be supplied with electricity by a relatively low voltage power supply, for example, one or more batteries, fuel cells, or the like, which may be combined with one or more transformers to adjust voltage suitable for actuator operation.

The controller processor may execute instructions that provide at least some of the functionality for the actuators 48. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, field programmable gate arrays, and/or any other suitable type of electronic processing device(s).

Also, the controller memory may be configured to provide storage for data received by or loaded to the controller, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage article and/or device.

Further, the controller interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, and/or any other suitable protocol(s). The interfaces may include circuits, software, firmware, or any other device to assist or enable the controller in communicating with other devices.

Figure 6:
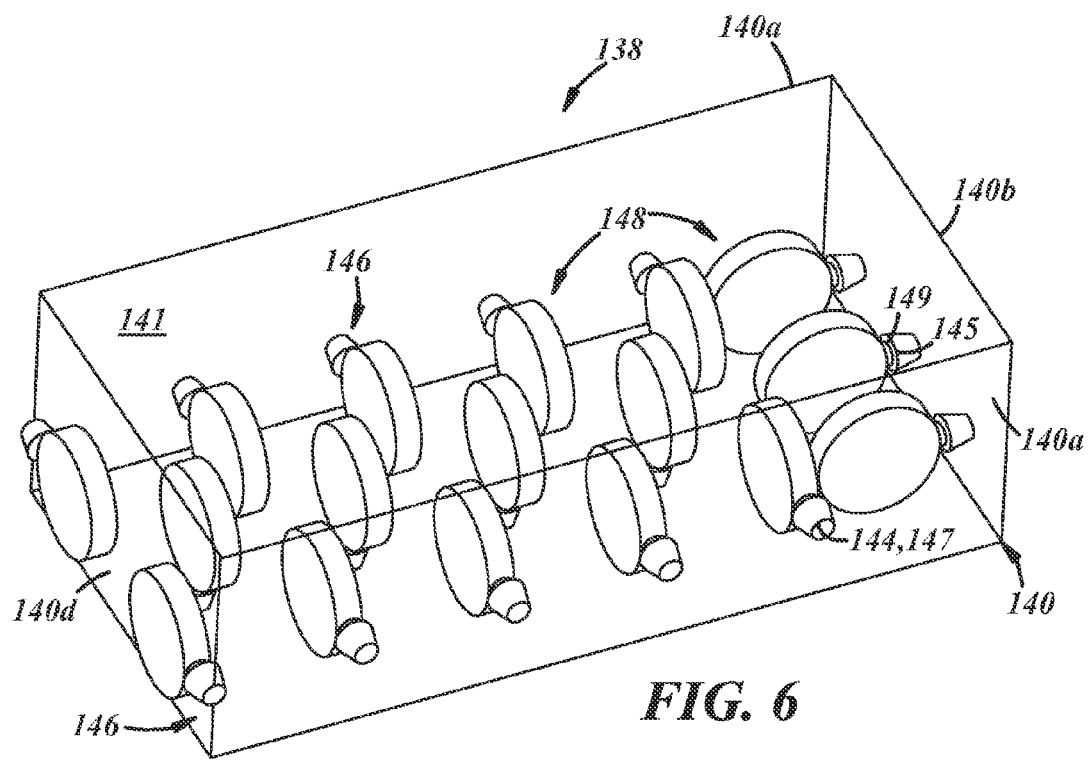
FIG. 6 is a fragmentary, perspective, schematic view of another illustrative embodiment of a boundary layer control system, including an array of actuators and corresponding nozzles.

FIG. 6 shows another illustrative embodiment of an active bleed system 138 for controlling a boundary layer over an airfoil. This embodiment is similar in many respects to the embodiment of FIGS. 1-6 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

The system 138 includes a housing with an induction wall omitted for clarity, one or more exhaust walls 140, and a chamber 141. The exhaust wall(s) 140 may include side walls 140*a* and end walls 140*b*, one of which is omitted for clarity, and a bottom wall 140*d*. One or more of the walls 140 may have one or more exhaust ports 144. The exhaust ports 144 may include nozzles 146 that may extend inwardly, for instance, from the exhaust wall(s) 140 to the chamber 141. The nozzles 146 may include entrances 145 on interior sides of the exhaust walls 140 and exits 147 at exterior sides of the exhaust walls 140.

Figure 7:
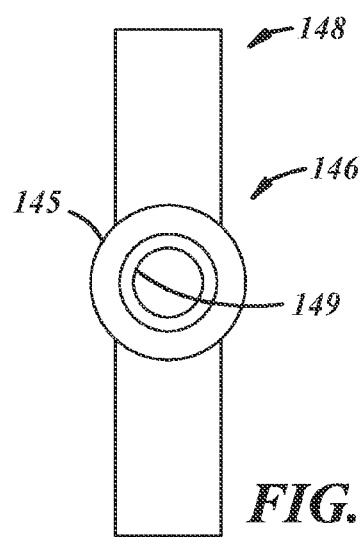
FIG. 7 is a schematic end view of one of the actuators and a corresponding one of the nozzles.

The system 138 also includes a plurality of ZNMF actuators 148 in the chamber 141. The actuators 148 may be arranged in an array, for example, evenly distributed in the housing including actuators 148 associated with side walls 140*a*, end walls 140*b*, and a bottom wall 140*d*, as illustrated, or in any other suitable configuration. Each actuator orifice 149 may be in registration with the corresponding exhaust port 144. For example, as illustrated in FIG. 6, the actuator orifice 149 axially overlaps the nozzle 146. Also, as illustrated in FIG. 7, the nozzle entrances 145 may be larger in diameter than the actuator orifices 149 and may be concentrically aligned therewith. In the illustrated example, each of the walls 140*a*, 140*b*, 140*d* have corresponding nozzles 146 and actuators 148.

The presently disclosed bleed path 30 and system 38 reduce, eliminate, or prevent boundary layer separation over the suction surface 28 of the rotor blade 14, with concomitant reduction, elimination, or prevention in drag and inefficiency of the blade 14. For example, the bleed path 30 and system 38 may be used to reduce, eliminate, or prevent boundary layer separation whether the flow is laminar or turbulent, and may be particularly beneficial for use in applications with low Reynolds numbers. For instance, it is believed that the presently disclosed bleed path 30 and system 38 will reduce power required to rotate a propeller and may increase efficiency of propellers at high altitudes and/or rotating slowly. Moreover, the bleed path 30 and system 38 is relatively low in weight and low in cost. Although the presently disclosed bleed or active control system may delay, reduce, or prevent laminar and/or turbulent boundary layer separation, the present invention is not limited to laminar or turbulent boundary layers. The disclosed system may "pump" bleed flow overboard, rather than relying upon complex tubing to direct the bleed flow to a naturally-occurring low pressure "sink." Without the disclosed system, the naturally occurring pressures adjacent to the external surface of the blade may be too high to provide a sufficient low-pressure "sink."

This description, rather than describing limitations of an invention, only illustrates example embodiments of the invention recited in the claims. The language of this description is therefore exclusively descriptive and non-limiting. Obviously, it's possible to modify this invention from what the description teaches. Within the scope of the claims, one may practice the invention other than as described above.

What is claimed is:

1. An airfoil active boundary layer control system, comprising:
    a housing including an induction wall having a gas permeable surface, an exhaust wall having at least one exhaust port, and a chamber disposed between and at least partially defined by the induction and exhaust walls; and at least one zero-net-mass-flux actuator in the chamber including an actuator orifice in fluid communication with the gas permeable surface of the induction wall and the at least one exhaust port, the actuator orifice being aligned with the at least one exhaust port.

2. The airfoil active boundary layer control system of claim 1, wherein the gas permeable surface includes at least one of a porous surface or an apertured surface.

3. The airfoil active boundary layer control system of claim 1, wherein the at least one exhaust port includes a nozzle.

4. The airfoil active boundary layer control system of claim 3, wherein the actuator orifice axially overlaps the nozzle in a direction along an exhaust axis extending longitudinally through the nozzle.

5. The airfoil active boundary layer control system of claim 3, wherein the nozzle is larger in diameter than the actuator orifice.

6. The airfoil active boundary layer control system of claim 3, wherein the nozzle includes a nozzle entrance on an interior side of the exhaust wall and an exit on an exterior side of the exhaust wall.

7. The airfoil active boundary layer control system of claim 6, wherein the nozzle entrance has a larger diameter than the nozzle exit and the actuator orifice is conically convergent at an open end and circumscribed by the nozzle entrance.

8. The airfoil active boundary layer control system of claim 1, wherein the actuator orifice is in registration with the at least one exhaust port.

9. An airfoil including the airfoil active boundary layer control system of claim 1, and also including:
   a leading surface;
   a trailing surface spaced from the leading surface;
   a pressure surface extending between the leading and trailing surfaces;
   a suction surface extending the leading and trailing surfaces; and
   a bleed path that opens to the suction surface, extends through the airfoil, and through which working fluid flows to actively bleed working fluid from the suction surface,
   wherein the airfoil active boundary layer control system of claim 1 is carried between the pressure and suction surfaces with the induction wall of the airfoil active boundary layer control system being part of the bleed path at the suction surface.

10. The airfoil of claim 9, wherein the bleed path includes:
   an inlet in the suction surface to receive working fluid on the suction surface;
   a conduit in communication with the inlet and configured to convey the working fluid from the inlet toward the tip region; and
   an outlet in communication with the conduit, disposed radially outwardly of the inlet to exhaust the working fluid from the conduit.

11. An active boundary layer control for an airfoil, comprising:
   a housing including an induction wall having a gas permeable surface, an exhaust wall having one or more exhaust ports, and a chamber between the induction and exhaust walls;
   a plurality of zero-net-mass-flux actuators located in the chamber and configured and positioned to at least augment bleed through the airfoil by collectively inducting fluid through the gas permeable surface of the induction wall and selectively exhausting fluid through the one or more exhaust ports; and
   a plurality of actuator orifices carried by respective actuators of the plurality of zero-net-mass-flux-actuators, the plurality of actuator orifices being positioned and aligned to entrain into a respective one of the one or more exhaust ports at least some air that does not pass through the plurality of actuator orifices.

12. The active boundary layer control system of claim 11, wherein the gas permeable surface includes at least one of a porous surface or an apertured surface, the one or more exhaust ports include nozzles including nozzle entrances.

13. The active boundary layer control system of claim 12, wherein the nozzle entrances have larger diameters than the nozzle exits and actuator orifices of the plurality of actuator orifices are conically convergent at open ends and circumscribed by the nozzle entrances and actuator orifices axially overlap the nozzle entrances in a direction along exhaust axes extending longitudinally through the nozzles.

14. The active boundary layer control system of claim 11, wherein actuator orifices of the plurality of actuator orifices are in registration with the one or more exhaust ports.

15. An airfoil including the active boundary layer control system of claim 11, and also including:
   a leading surface;
   a trailing surface spaced from the leading surface;
   a pressure surface extending between the leading and trailing surfaces;
   a suction surface extending the leading and trailing surfaces; and
   a bleed path that opens to the suction surface, extending through the airfoil, and through which working fluid flows to actively bleed working fluid from the suction surface,
   wherein the active boundary layer control system of claim 11 is carried between the pressure and suction surfaces with the induction wall of the active boundary layer control system being part of the bleed path at the suction surface.

16. The active boundary layer control system of claim 11, wherein the housing includes a plurality of exhaust walls, each having a plurality of the exhaust ports and each corresponding to multiple zero-net-mass-flux actuators.

17. The active boundary layer control system of claim 11, wherein the plurality of zero-net-mass-flux actuators are arranged in an array evenly distributed in the housing including respective zero-net-mass-flux actuators associated with the exhaust wall having side walls, end walls, and a bottom wall.

18. A method of actively controlling a boundary layer of fluid flowing over an airfoil suction surface, comprising:
   inducting at least some of the fluid through a portion of the airfoil suction surface, into a chamber under the airfoil suction surface, and into an actuator orifice of a zero-net-mass-flux actuator located in the chamber; and
   exhausting fluid out of the zero-net-mass-flux actuator through the actuator orifice thereof, through a chamber exhaust port located in an exhaust wall that is aligned with the actuator orifice, and out of the chamber exhaust port to an interior of the airfoil.

* * * * *